Figure 1:
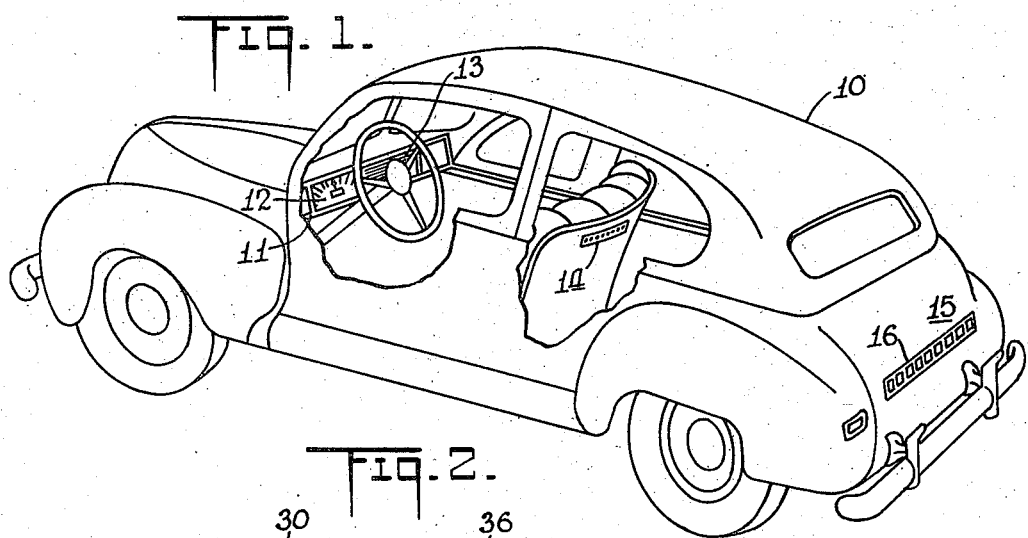

Oct. 26, 1948.  P. ADDORISIO  2,452,344
VEHICLE SPEED INDICATING DEVICE
Filed Oct. 31, 1946

INVENTOR
*Patsy Addorisio*
BY
*Benjamin Sweedler*
ATTORNEY

Patented Oct. 26, 1948

2,452,344

UNITED STATES PATENT OFFICE 2,452,344

VEHICLE SPEED INDICATING DEVICE

Patsy Addorisio, Port Chester, N. Y.

Application October 31, 1946, Serial No. 706,839

1 Claim. (Cl. 177—311.5)

This invention relates to an automobile or other vehicle speed indicating device constructed and designed so that a suitable signal, desirably audible under the control of the chauffeur or driver and one or more passengers is given when the vehicle travels at a speed above a desired speed so that the chauffeur or passenger or both will be aware thereof and take the necessary action to reduce the speed, thereby promoting highway safety.

Speed indicating devices which provide visual and audible signals indicating the speed at which the vehicle is travelling are well known. Such speed indicating devices heretofore known have the objection that they are under the control of one person only within the vehicle, usually the chauffeur who frequently pays little or no attention to the device. In many cases the chauffeur may see fit not to place the speed indicating device in operative condition, e. g., to indicate when the vehicle is travelling at a rate above the maximum speed at which it is desired to have the vehicle travel.

To the best of my knowledge and belief no speed indicating device has been developed prior to this invention which is under the independent control of both the chauffeur and the passenger, say a passenger in a rear seat of a sedan or coach, which device is operative to give a signal, preferably audible, so that it will become instantly apparent to the passenger or chauffeur or both that the vehicle is travelling at a speed in excess of the speed at which either the passenger or driver desires to travel. Without such indicating device the passenger or driver, particularly the passenger, may be oblivious to the speed of the vehicle because of preoccupation with other concerns, for example the passenger may be deep in conversation with other passengers and therefore not aware of the speed at which the vehicle is travelling. The speed indicating device of this invention gives an audible or visual signal, preferably audible, which instantly makes it apparent that the vehicle is travelling at a speed in excess of the desired maximum speed thereby calling attention to the desirability of reducing the speed.

It is an object of this invention to provide a speed indicating device which is under the independent control of the chauffeur or driver and one or more passengers to give a signal, preferably audible, when the vehicle reaches a speed in excess of that at which the chauffeur or passenger desires to travel so that the chauffeur may reduce his speed or the passenger may request the chauffeur to do likewise, thereby tending to prevent travel of the vehicle at excessive speeds and thus promoting highway safety.

Another object of this invention is to provide such speed indicating device with a signal operative to indicate the speed at which the vehicle is travelling, which signal is disposed on the exterior of the vehicle where it may be observed by others exteriorly of the vehicle and therefore will have a tendency to cause the chauffeur to drive the vehicle at a speed within the speed limit.

Figure 2:
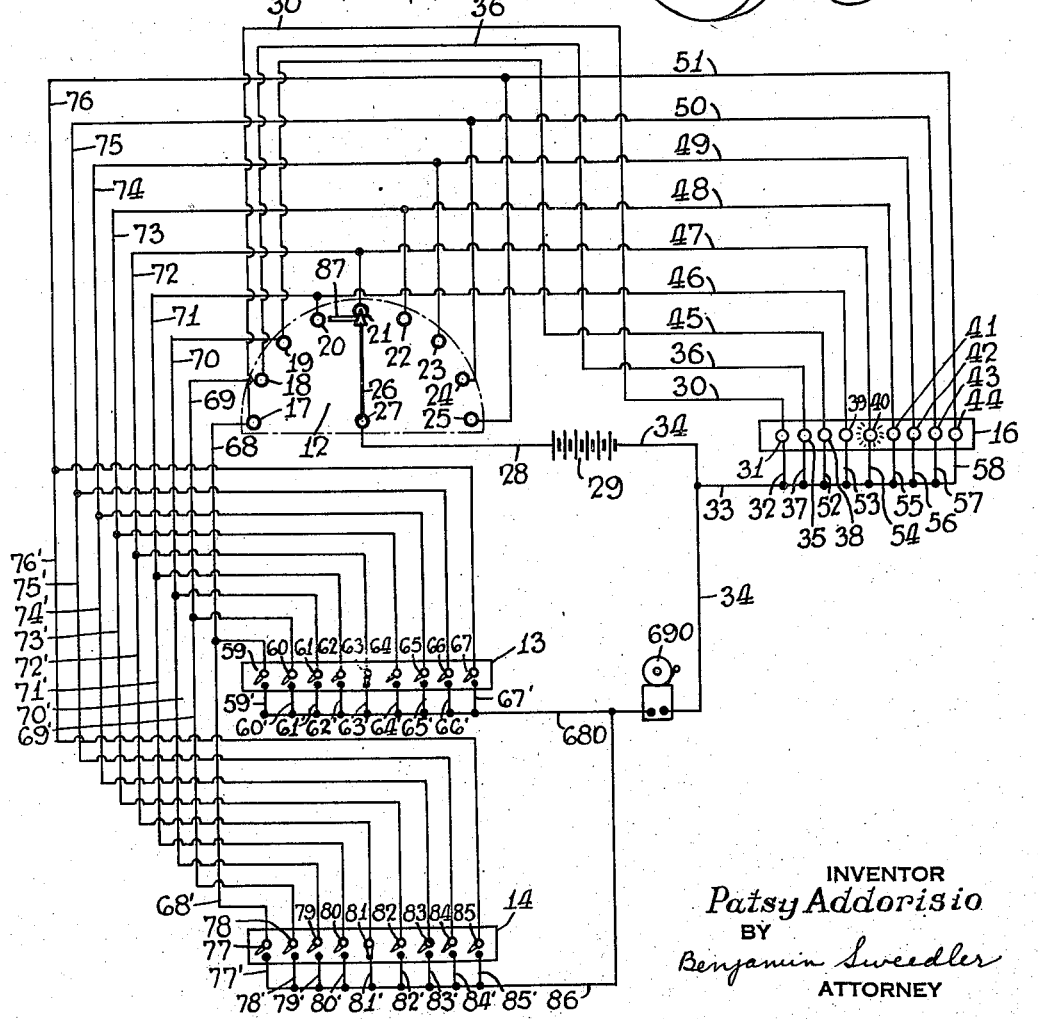

Other objects and advantages of this invention will be apparent from the following detailed description thereof taken in connection with the accompanying drawing in which:

Fig. 1 is a perspective view partly broken away of one form of vehicle embodying this invention and showing the relative position of the control panels and of the external speed indicating device; and Fig. 2 is a wiring diagram of the speed indicating device embodying this invention.

In the drawing, reference character 10 indicates an automobile of the coach or sedan type having on the dash board 11 a speedometer 12 which may be of any conventional type and a control panel 13 which is so positioned that it is readily accessible to the chauffeur. The invention, it will be understood, is applicable not only to the type of vehicle shown but to all other types of vehicles such as taxicabs, formal cars, etc. A second control panel 14 is positioned in the rear of the car, desirably on the back of the front seat where it is readily accessible to the passengers sitting in the rear seat. The control panels 13 and 14, it will be understood, may be positioned at any suitable location within the car where they are accessible respectively to the chauffeur and passenger or passengers in the rear seat. Disposed on the outside of the car, preferably on the back of the car as indicated at 15, is a bank of signal lamps 16, there being one such lamp for each speedometer switch hereinafter described. Thus if the speedometer is provided with nine switches located to indicate speeds in units of 10 miles per hour up to 90 miles per hour, preferably nine lamps are provided in the back corresponding to speeds of 10, 20, 30, 40, 50, 60, 70, 80 and 90 miles per hour. It will be understood any desired number of speedometer switches and lamps may be employed to indicate desired rates of speed.

Fig. 2 shows a wiring diagram indicating the preferred circuit connections between the speedometer 12, control panels 13, 14 and the bank of lamps 16. As shown in Fig. 2, the speedometer 12 has a series of contact points 17, 18, 19, 20, 21, 22, 23, 24, and 25 of electrical conducting material; contact point 17 is positioned to indicate a speed of one mile per hour and each of the succeeding contact points a speed of 10 miles per hour greater than the preceding contact point. Thus 19 is positioned to indicate a speed of 20 miles per hour, 20 thirty miles per hour, etc. A speedometer pointer 26 of electrical conducting material is connected with the driving mechanism of the car so that it moves to indicate the speed of the car. This pointer cooperates with the contact points to form a series of speedometer switches; when the pointer is in contact with a given contact point the switch is closed; when not in contact the switch in question is open. This pointer is pivoted at 27 and is connected to an electrical conductor 28 communicating with one side of a battery 29 which may be a dry cell but preferably is the storage battery of the vehicle. Contact point 17 through conductor 30 is in circuit with lamp 31 in the bank of lamps 16, this circuit being completed to the other side of the battery 29 through conductors 32, 33, 34. Contact 18 is in circuit with the second lamp 35 of the bank of lamps 16 through conductor 36, this circuit being completed through a conductor 37 which communicates with conductor 33. In like manner each of the contact points 19 to 25 inclusive are respectively in circuit with each of the lamps 38 and 44 inclusive by conductors 45 to 51 inclusive, these circuits respectively being completed through conductors 52 to 58 inclusive which lead into the conductor 33. Thus when the speedometer pointer 26 makes contact with one of the contact points 17—25 inclusive a circuit through one of the lamps 31, 35, or 38 to 44 inclusive is completed, energizing the lamp in the circuit thus completed so that it will indicate the speed at which the vehicle is travelling. The bank of lamps 16 may be provided with numerical indicia showing the speeds corresponding to the respective lamps of the bank.

The chauffeur's control panel 13 is provided with a series of switches 59 to 67 inclusive equal in number to the number of speedometer switches and signal lamps. Any desired type of switch may be employed. The form shown in the drawing involves a pivoted switch which switch in the case of switch 63 is shown in closed position and in case of the other switches on the control panel are shown open. A conductor 68 leads from contact point 17 to one terminal of switch 59. In like manner conductors 69 to 76 inclusive lead respectively from the contact points 18 to 25 inclusive to one terminal of switches 60 to 67 inclusive respectively. The other terminal of each of switches 59 to 67 inclusive are provided with conductors 59' to 67' inclusive respectively, all of which are connected by a conductor 680 leading to one terminal of a bell or other audible signalling device 690, the other terminal of which is connected to conductor 34 leading to the storage battery 29. It will be understood bell 690 represents one type of known signalling device; other types audible or visual may be used if desired. Thus when one of the switches 59 to 67 is closed by the chauffeur or driver, say switch 63, and the speedometer pointer 26 contacts the contact points 17 to 25 inclusive in circuit with the closed switch, i. e., contact point 21 in the case of switch 63, a circuit is completed from the battery 29 through conductor 28, speedometer pointer 26, contact point 21, conductor 72, switch 63, conductor 63', conductor 680, bell 690 and conductor 34 back to the battery 29.

Control panel 14 is provided with a series of switches 77—85 inclusive equal in number to the number of switches on control panel 13. These switches may be of the same type as the switches on the chauffeur's control panel 13. These switches are disposed in circuits in parallel with the circuits containing the switches on the control panel 13, i. e., the passenger control circuits and the chauffeur's control circuits are in parallel with each other and both are in series with the contact points 17—25 inclusive on the speedometer 12. Conductor 68 leading from contact point 17 has an extension 68' leading to one terminal of switch 77 of passenger control panel 14, the other terminal of switch 77 being provided with a conductor 77' which leads into a conductor 860 connected to conductor 68 leading to the signalling device 690. In like manner each of the conductors 69—76 inclusive are provided with extensions 69' to 76' respectively, these extensions being connected with one terminal of the switches 78—85 respectively, the other terminal of these switches being connected to conductors 78' and 85' respectively, all of which conductors are connected to conductor 86.

It will be noted each of the switches 77—85 inclusive is in circuit with and individual to one of the contact points 17—25 inclusive; likewise each of the switches 59 to 67 inclusive is in circuit with and individual to one of the contact points 17—25 inclusive and each of the lamps of the bank of lamps 16 is in circuit with and individual to the speedometer switches opening and closing of which is effected by the speedometer pointer.

In operation when a passenger closes one of the switches on the passenger control panel 14, say switch 81, and speedometer pointer 26 engages the contact point in circuit with the closed switch, contact point 21 in the case of switch 81, a circuit is completed from the battery 29 through conductor 28, speedometer pointer 26, contact point 21, conductor 72, extension 72', switch 81, conductor 81', conductor 86, signalling device 690 and conductor 34 back to the battery 29. When a chauffeur closes one of the switches on the panel 13 and the speedometer switch in circuit therewith is closed by the speedometer pointer making contact with the proper contact point a circuit, hereinabove described, will be completed to bell 690 causing it to ring and thereby notifying the driver the car is travelling at a rate in excess of the desired maximum rate of speed. The driver or passenger, when closing a switch, selects a switch which corresponds to a rate of speed slightly in excess of the desired maximum rate of speed; an ample number of speedometer contact points suitably located on the speedometer are provided for this purpose. Accordingly, bell 690 does not ring while the car is travelling below this maximum speed, the bell being energized only when the desired maximum rate of speed is exceeded. Each lamp 31, 35 and 38 to 44 inclusive is energized as the speedometer switch in circuit therewith is closed by the speedometer pointer; the bank of lamps 16 therefore indicates at all times to an observer, say a highway patrolman, the speed at which the vehicle is travelling.

Since the chauffeur control circuits and the passenger control circuits are in parallel with each other, operation of the switches on the passenger control panel effects actuation of the signalling device 690 independently of the operation of the signalling device by the switches on the chauffeur control panel 13. Thus, for example, if the passenger desires to travel at a speed below 40 miles per hour and for this purpose closes switch 81 corresponding to a 40 mile per hour speed and the chauffeur closes the switch corresponding to a higher speed, say switch 64, when the car reaches a speed of 40 miles per hour the speedometer pointer 26 contacts contact point 21. As soon as this happens the circuit hereinabove described through switch 81 is completed, causing the bell 690 to ring, apprising the passenger that the vehicle has reached a speed of 40 miles per hour so that he can direct the chauffeur to reduce the speed. If he selects a lower maximum speed than the chauffeur he will be apprised of the fact that the car is exceeding his selected speed by the ringing of the bell and hence take the necessary action to have the chauffeur reduce the speed. Should the chauffeur select a lower speed, the bell will ring as soon as this speed is exceeded; if the chauffeur continues to increase the speed the bell will ring again when the speedometer pointer closes the speedometer switch in circuit with the switch closed on the passenger control panel.

The speedometer pointer 26 preferably is provided with an electrical conducting extension 87 of a length to bridge the space between two contact points so that the bell 690 will continue to ring throughout a 10 mile range of speed, i. e., while the speedometer pointer 26 or the extension 87 is in contact with a contact point in circuit with one of the closed switches of the chauffeur control panel 13 or of the passenger control panel 14.

The bell 690 may desirably be positioned under the dash of the car or at any other suitable point.

It will be noted that this invention provides a speed indicating device which is under the independent control of both the chauffeur and one or more of the passengers, including the passengers in the rear seat of the vehicle so that the passengers may operate the switches on the passenger control panel for causing a signal to be given when the vehicle reaches a predetermined maximum speed above that at which it is desired to travel whereby when the signal is heard or perceived the passenger or passengers and the chauffeur may take the necessary action to effect a reduction in the speed of the vehicle, thereby tending to prevent travel of the vehicle at excessive speeds and thus promoting highway safety. The bank of signal lamps 16 at all times indicates the speed at which the vehicle is travelling to any observer and hence has a tendency to cause the chauffeur to drive the vehicle at a speed within the speed limit, thereby further promoting highway safety.

Since certain changes may be made in the signalling device hereinabove described without departing from the scope of this invention, it is intended that all matter contained in the above description or shown in the accompanying drawing shall be interpreted as illustrative and not in a limiting sense. Thus, for example, the circuit containing the speedometer switches 17 to 25 inclusive, which it will be noted are opened and closed automatically as the speedometer pointer moves, and the bank of lamps 16 could be separate and independent from those containing the switches on the control panels 13 or 14. In other words one source of current such as a dry cell may be used to energize the lamps when the speedometer switch in circuit with a given lamp is closed automatically by the speedometer pointer and another and separate source of current, say battery 29, may be used to energize bell 690 in which case separate and distinct circuits may be used connecting the speedometer switches and the lamps 16 on the one hand and the speedometer switches, the switches on control panels 13 and 14 and bell 690 on the other hand. Also a bank of lamps in circuit with the speedometer switches may be disposed on the front of the vehicle as well as or instead of the bank of lamps on the rear of the vehicle as shown in Fig. 1.

What is claimed is:

In a vehicle speed indicating device for a vehicle having a front seat for a chauffeur and a rear seat for passengers, comprising, in combination, a series of speedometer switches consisting of a series of contacts and a speedometer pointer adapted in its movement to engage said contacts and thus close circuits in which said contacts are disposed, each of said contacts corresponding to a different rate of speed, a control panel provided with a series of switches equal in number with the number of speedometer switches and each disposed in a circuit which is in series with and individual to a speedometer switch, said control panel being positioned so that the switches thereof are operable by the driver, a second control panel having a series of the switches equal in number to the number of speedometer switches, each in circuit with and individual to a speedometer switch, said second control panel being positioned so that the switches thereof are operable by a passenger in the rear seat, the circuits containing said switches in the second control panel being in parallel with the circuits containing the switches in the first mentioned control panel and both of said circuits being in series with the circuits containing the speedometer switches, a series of lamps equal in number to the number of speedometer switches, each lamp of said series being in circuit with and individual to a speedometer switch and a signalling device in circuit with the switches of both of said control panels.

PATSY ADDORISIO.

REFERENCES CITED

The following references are of record in the file of this patent:

UNITED STATES PATENTS

| Number | Name | Date |
|---|---|---|
| 889,533 | Maas | June 2, 1908 |
| 1,010,412 | Butler | Dec. 5, 1911 |
| 1,042,316 | Cantrall | Oct. 12, 1912 |
| 1,655,787 | Harris | Jan. 10, 1928 |

Certificate of Correction

Patent No. 2,452,344.

October 26, 1948.

PATSY ADDORISIO

It is hereby certified that errors appear in the above numbered patent requiring correction as follows:

In the grant, line 13, for "Patsy Addorisio, her heirs" read *Patsy Addorisio, his heirs*; in the printed specification, column 3, line 31, and column 4, line 26, strike out the word "and" and insert instead *to*;

and that the said Letters Patent should be read with these corrections therein that the same may conform to the record of the case in the Patent Office.

Signed and sealed this 22nd day of February, A. D. 1949.

[SEAL]

THOMAS F. MURPHY,
*Assistant Commissioner of Patents.*